Jan. 26, 1965 T. V. SELING 3,167,714

SIGNAL-REFERENCE TIME-DUPLEXED MICROWAVE RADIOMETER

Filed Aug. 27, 1962

INVENTOR.
Theodore V. Seling
BY
Paul J. Ethington
ATTORNEY 3,167,714

SIGNAL-REFERENCE TIME-DUPLEXED MICROWAVE RADIOMETER

Theodore V. Seling, Lansing, Mich., assignor to General Motors Corporation, Detroit, Mich., a corporation of Delaware Filed Aug. 27, 1962, Ser. No. 219,447
7 Claims. (Cl. 325—363)

This invention relates to a microwave radiometer wherein the input to a receiver is time-duplexed between a target signal and a reference signal. More particularly, the invention relates to a novel implementation for a time-duplexed radiometer receiver which greatly relaxes the input signal bandwidth limitations which were previously inherent in microwave radiometers.

A radiometer is a signal measuring device for providing an indication of the absolute temperature of a body as determined by the magnitude of microwave frequency energy which is radiated therefrom. Because of the inherent weakness of the input signal and the strong possibility of obscuring the input signal with system generated noise or gain fluctuations, it is necessary to reference the sum of the target signal and the system generated noise against the system generated noise itself. When this reference is made the component of system generated noise effectively cancels and renders the system sensitive only to the input target signal.

A presently known method for accomplishing the above referencing or time-duplexing entails switching the input to a radiometer detector alternately between the radiometer antenna and a source of reference signals or noise. The output of the detector is then switched in synchronism with the input between two channels of a differential amplifier. When the switch is in the antenna position, the input to the amplifier is the sum of the effective temperature of the target at which the antenna is directed plus the effective noise temperature generated within the system. When the switch is in the reference position, the receiver output, that is the second input to the amplifier, is the sum of the noise generated in the reference termination plus that which is generated within the system. The output of the amplifier is then the difference between the two inputs, i.e., the difference between the target signal and the reference signal. The output of the amplifier is then amplified and filtered to the desired output bandwidth.

Such a system as described above requires a physical switch to provide the input switching to the radiometer receiver. A typical switch in this application is a ferrite switch which is not sufficiently broadband to pass the entire frequency band required. Typically, a superhererodyne radiometer receiver operating at 35,000 mc. will have an IF amplifier operating at 3000 mc. with a 1000 mc. bandwidth. Thus, the radiometer receiver has two frequency bands at which it can accept signals, viz., 32,000 ±500 mc. and 38,000±500 mc. Thus, the required switch bandwidth is 35,000±3500 mc. As previously mentioned, the typically used ferrite switches have a bandwidth of only plus or minus 1000 mc. at 35,000 mc. Therefore, the use of such a switch permits only one of the signal bands to be received and the radiometer performance is degraded by a factor of four as compared to a radiometer which can accept both bands. Since it is apparent that the received signal power will incerase with the bandwidth of the receiver, it is of significant advantage to increase the frequency range of acceptable signals.

The present invention, which also operates on a signal-reference time-duplexing procedure, eliminates the requirement for a physical switch at the input to the receiver and, therefore, greatly improves the bandwidth over which signals may be received.

This is accomplished through the combination of a mixer which is connected both to the radiometer antenna and to a local oscillator by means of input means which may take the form of a directional coupler such that the mixer provides an output related to the frequency difference between the local oscillator signal and the antenna signal. This output signal falls in the IF range suitable for application to an IF amplifier and subsequent circuit components. To provide the signal-reference duplexing, the local oscillator is modulated by a source of square wave switching signals to turn the oscillator on and off, thus, providing a switching action to the input of a radiometer detector. When the local oscillator is turned on by the source of switching signal, the mixer receives the variable magnitude antenna signal as well as the local oscillator signal. These two signals are mixed to provide a first mixer output signal which is directly related to the temperature of the body radiating microwave energy to the antenna. When the local oscillator is turned off by the source of switching signals, no mixing action takes place and the available output signal from the mixer is directly related to the absolute temperature of the mixer itself. Thus, the mixer provides the source of reference signals.

It has been noted that under circumstances related above, the thermal noise which is generated in the mixer, often referred to as "Johnson noise," is subject to variation due to the changes in the input signal from the local oscillator. Thus, the reference noise level may differ during the respective on and off times of the local oscillator. Characteristically, the mixer noise is greater when the oscillator is on. However, it is possible that the reverse may be true under certain circumstances of impedance matching.

In order to stabilize the level of the reference noise provided by the mixer, constant magnitude signals from a suitable source may be periodically applied to the mixer in synchronism with the square wave switching signals. In a preferred embodiment of the invention, the signals generated by a suitable square wave generator are applied directly to both the local oscillator and the mixer to serve as a modulator for the oscillator and a bias source for the mixer. In the event the Johnson noise level of the mixer is greater when the local oscillator is on rather than off, the square wave is applied to the crystal mixer during the off time of the local oscillator. The magnitude of the square wave is carefully regulated to maintain the effective temperature of the mixer constant irrespective of the on or off state of the local oscillator.

Briefly describing the radiometer detector to which the first and second output signals of the crystal mixer are applied, the IF mixer output signals are amplified and applied to first and second signal channels having first and second gating means respectively therein. The gating means in the separate channels are also interconnected with the source of switching signals so as to be alternately rendered conductive in synchronism with the source of switching signals to thereby separate the first and second output signals from the mixer between the channels. Suitable signal comparison means are then connected to receive the signals from the respective channels and provide a final output signal which is related to the difference between the first and second output signals. This third output signal is then filtered to the desired bandwidth and recorded as indication of the temperature of the target radiating microwave energy to the antenna.

The operation and implementation of the present invention will be more readily understood upon referring to the following specification taken with the accompanying drawings of which:

Figure 1:
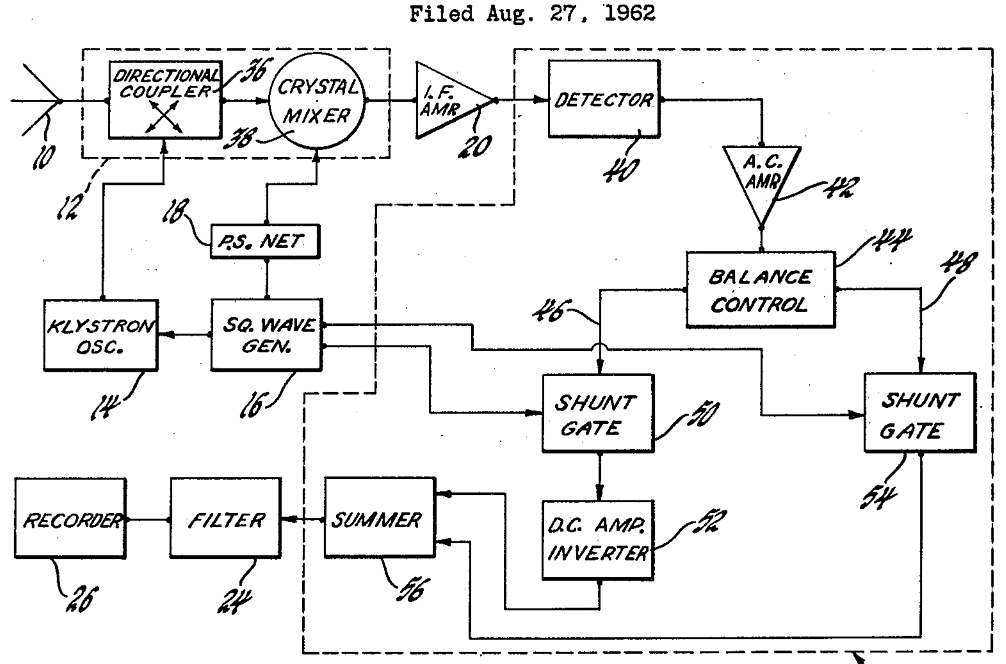
FIGURE 1 is a block diagram of the radiometer circuit.

Referring now to the invention as illustrated in FIGURE 1, a suitable microwave antenna 10 adapted to receive microwave energy from thermally radiating bodies is connected to a mixer 12. The mixer 12 is adapted to mix a variable frequency input signal with a constant frequency reference signal to convert the frequency of the input signal into a lower IF value suitable for application to subsequent circuitry. A local oscillator 14 which may take the form of a klystron, as illustrated in the drawing, is also connected to the mixer 12 to provide the reference frequency signal with which the antenna signal is mixed. Connected to the klystyron oscillator 14 is a square wave generator 16 which serves as a central timing means for the system. The square wave generator 16 is adapted to turn the klystron oscillator 14 on and off at a fixed rate according to the frequency of the square wave generated thereby. The square wave generator is also connected to the mixer 12 through a suitable phase shift network 18 as shown. The output of the mixer 12 is connected to an IF amplifier 20 which is adapted to amplify the mixer output to a more useable level. The output of the amplifier 20 is in turn connected to a phase sensitive detector generally designated at 22. The square wave generator 16 is also interconnected with the phase sensitive detector 22 for the purpose of conveying information to the phase sensitive detector as to the on or off state of the klystron oscillator 14. The output of the phase sensitive detector 22 is then connected to a filter 24 which filters the radiometer signal to the desired bandwith and applies the signal to a recorder 26 which may take a number of forms.

Figure 2:
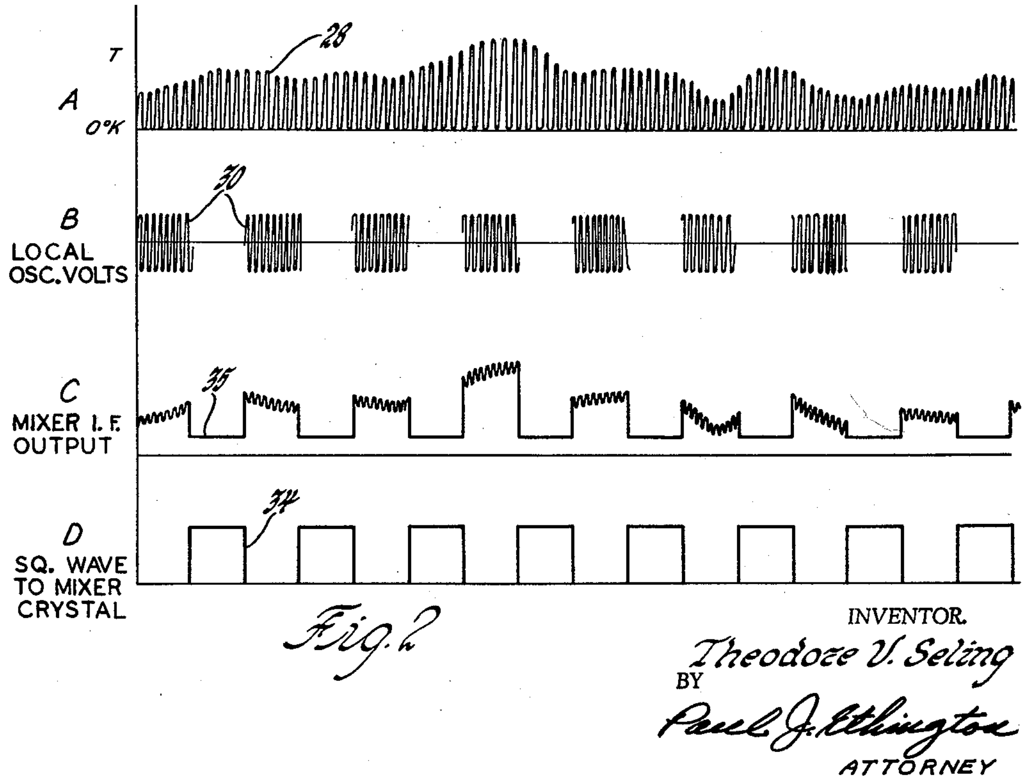
FIGURE 2 is a chart of wave forms which are present at various points in the circuit of FIGURE 1.

Describing now the operation of the circuit of FIGURE 1 in greater detail, reference should also be had to the wave forms of FIGURE 2. The microwave signal which is incident upon the antenna 10 may take the form of random high frequency electromagnetic wave energy as shown by the envelope 28 in FIGURE 2. The amplitude of this envelope increases or decreases according to the absolute temperature of a target radiating microwave energy to the antenna 10. This variable signal is applied as a first input to the mixer 12. The output of the klystron oscillator 14 takes the form of periodically spaced bursts 30 of the high frequency pulses as shown on line B of FIGURE 2. These bursts 30 produced by the oscillator 14 are the result of the modulating square wave pulses which are applied from the square wave generator 16. These periodic pulses 34 are shown on line D of FIGURE 2. The mixer 12, thus, produces an output such as that shown on line C of FIGURE 2. This output consists of variable amplitude pulses of IF energy occurring synchronously with the bursts 30 from the local oscillator 14. It is, thus, apparent that during the off time of the local oscillator 14, the output of the mixer 12 assumes a constant level designated at 35 in the output wave form of FIGURE 2C. The output wave form from the mixer 12 is then amplified to a more useable level in the amplifier 20 and applied to the phase sensitive detector 22.

It can be seen that during the on time of the local oscillator 14, the input to the phase sensitive detector 22 consists of the IF signal produced by mixing the antenna signal and the local oscillator signal. During the off time of the local oscillator 14, the input to the phase sensitive detector consists of the Johnson noise which is generated in the mixer 12. The phase sensitive detector 22 is then effective to difference the two input signals, the resulting difference between the variable signal input to the antenna 10 and the constant signal generated as thermal noise in the mixer 12, thus, being a direct indication of the magnitude of the microwave energy incident upon the antenna 10.

As previously mentioned, the thermal noise generated in the mixer 12 provides the reference signal for the system as indicated by signal level 35 of FIGURE 2C. In order to maintain this thermal noise at a constant level, so as to provide a constant reference signal, the output of the square wave generator 16 is applied through the phase shift network 18 to the mixer 12 in a phase relation suitable to compensate for the difference in the mixer noise occurring between the on and off conditions of the local oscillator 14. Ordinarily the thermal noise generated in the mixer crystal 38 during the on periods of the local oscillator 14 is greater than that generated during the off periods of the oscillator. As a result the output of the mixer 12 may not present a true picture of the target area radiating to the antenna 10. For example when the radiometer system is employed to detect the presence of targets on a homogeneous background, there will be a residual signal output from the mixer even if no target is present. This residual signal is a constant, but variations in receiver gain can affect it to produce output signal variations which can be interpreted by the phase sensitive detector 22 as target signals.

To overcome this thermal noise difference, a constant amplitude signal is applied to the mixer crystal 38 to increase the thermal noise generation during the desired half cycle of the square wave from the generator 16 to maintain a constant mixer noise level irrespective of the on or off state of the local oscillator 14. This signal may come from a separate source, which is synchronized with the square wave generator 16. However, it is preferred to utilize the square wave produced by generator 16 as the bias signal. As shown in FIGURE 2, the pulses 34 are applied to the crystal 38 during the off times of the local oscillator 14. It can be seen that the phase shift network 18 need only be capable of either a zero or 180° phase shift.

Describing the system in greater detail, the mixer 12 consists of a directional coupler 36 and a crystal 38. The directional coupler 36 is a common microwave device which is used in this circuit to route the signals from the antenna 10 and the local oscillator 14 to the crystal 38. The directional coupler is typically a device which couples a secondary system, which in this case is the mixer crystal 38, only to a wave traveling in a particular direction in a primary transmission system, while completely ignoring a wave traveling in the opposite direction. Thus, there will be no signal backup from the klystron oscillator 14 to the antenna 10. The mixer crystal 38 is a crystal diode of which the non-linear characteristics are frequently used to mix two signals of different frequencies.

The phase sensitive detector 22 comprises a detector 40 which is effective to produce a square wave output which follows the original wave form as shown in FIGURE 2C. The square wave output of the detector is then amplified in an A.C. amplifier 42 to a level suitable for switching purposes and applied to a balance control 44. The function of the balance control 44 is to maintain a proper signal balance as between two signal channels 46 and 48.

Signal channel 46, which may be taken as the "target" channel, comprises a shunt gate 50 connected in series with an inverter 52. Signal channel 48, which may be taken as the "reference" channel, includes a second shunt gate 54. The shunt gates 52 and 54 are interconnected with the square wave generator 16 so as to be alternately rendered conductive to the respective signals transmitted through the channels 46 and 48. By synchronizing the operation of the gates 50 and 54 with the square wave generator 16, the target and reference output signals of the mixer 12 are effectively distributed between the two channels 46 and 48. Thus, the first output signal from the mixer 12, which occurs when the klystyron oscillator is on, is transmitted through the target channel 46, wherein it is inverted or phase shifted by 180° by the inverter 52. The signal produced by the mixer crystal 38 when the klystron oscillator 14 is turned off by the square wave generator 16, is then conducted through shunt gate 54 in the reference signal channel 48. The first and second signals are then applied to a summer 56 which is effective to produce an output signal which is related to the difference between the reference signal conducted through channel 48 and the phase shifted target signal conducted through channel 46. As previously stated, the output of the summer 56 is filtered to the desired bandwidth at 24 and recorded at 26. Thus, it can be seen that the radiometer receiver shown in FIGURE 1 is time-duplexed between an input signal from a radiometer antenna and a reference signal generated as thermal noise in a crystal mixer.

The circuit components shown in FIGURE 1 may assume a variety of forms. For instance, the balance control 44 may be a simple potentiometer arrangement having a displaceable center contact. The shunt gates 50 and 54 may be simple pentodes connected in shunt relation to the primary transmission path such that when a suitable square wave trigger signal is applied the signal normally traversing the primary transmission path is shunted to ground. The shunt gates 50 and 54 may also be replaced with a variety of suitable gating arrangements including series-type gates.

It is to be understood that various modifications may be made to the present invention as will be apparent to one skilled in the art. Thus, the illustrative embodiment shown herein is not to be construed in a limiting sense. For a definition of the invention, reference should be had to the appended claims.

What is claimed is:

1. Apparatus for detecting the temperature of a target radiating microwave energy including an antenna upon which microwave energy from the target may be incident, a source of constant microwave frequency signals, means connected to the source to turn the source on and off at a fixed rate, input means, frequency mixing means connected through the input means to the antenna and to the source and responsive to the combination of inputs from the antenna and the source to produce a first output signal during the on time of the source and responsive to the absence of an input from the source to produce a second output signal, the first signal being related to the magnitude of microwave energy incident upon the antenna and the second signal being related to the temperature of the frequency mixing means, and receiving means connected to receive the first and second signals and adapted to produce a third signal related to the difference therebetween.

2. Apparatus for detecting the temperature of a target radiating microwave frequency energy, the apparatus including an antenna adapted to receive microwave energy from the target, a source of constant magnitude energy of microwave frequency, switching means connected to the source to alternately turn the source on and off at a fixed rate, input means, frequency mixing means connected through the input means to the antenna and the source and responsive to the signals therefrom to alternately produce first and second output signals during the respective on and off times of the source, the first signal being related to the temperature of the target radiating energy to the antenna and the second signal being related to the temperature of the frequency mixing means, a bias source of constant magnitude energy connected to the frequency mixing means and synchronized with the switching means to be turned on and off in a predetermined phase relation to the on and off states of the source thereby to maintain the temperature of the mixing means at a constant level irrespective of the on or off state of the source, and receiving means connected to receive the first and second signals and adapted to produce a third signal related to the difference therebetween.

3. Apparatus for detecting the presence of bodies radiating microwave energy including an antenna adapted to produce a first signal related to the temperature of a body radiating mircowave energy thereto, a frequency mixer adapted to produce an output corresponding to the frequency difference between two input signals, a source of constant magnitude microwave frequency signals, input means for connecting the antenna and the source to the mixer, means to periodically interrupt the flow of signals from the source to the mixer whereby the mixer produces a first output signal related to the temperature of the body radiating microwave energy when the energy from the source is transmitted to the mixer and a second output signal related to the temperature of the mixer itself when the transmission of energy from the source to the mixer is interrupted, comparison means connected to receive the first and second output signals from the mixer, the comparison means comprising first and second signal channels operative to conduct the first and second output signals respectively, differential receiving means connected to the first and second signal channels and adapted to produce a third output signal related to the difference between the first and second signals.

4. The combination as defined by claim 3 including a bias source of constant magnitude energy connected with the mixer and synchronized with the periodic interruptions of energy from the source of microwave signals to maintain the temperature of the mixer constant irrespective of the signal input thereto.

5. A microwave radiometer for detecting the presence of a target radiating microwave energy including an antenna to receive microwave energy from the target, a source of constant magnitude energy of microwave frequency, switching means connected to the source to alternately turn the source on and off at a fixed rate, input means, a frequency mixer connected through the input means to the antenna and the source and responsive to the signals therefrom to alternately produce first and second output signals during the respective on and off times of the source, the first output signal being related to the temperature of the target and the second output signal being related to the temperature of the mixer, a bias source of constant magnitude energy connected to the mixer and synchronized with the switching means to apply energy to the mixer in a predetermined phase relation to the operaton of the switching means thereby maintaining a constant temperature in the mixer, first and second signal channels having first and second gating means respectively therein, the first and second gating means being alternately rendered conductive in synchronism with the switching means thereby separating the first and second output signals between the first and second signal channels respectively, comparison means connected to receive the first and second output signals and adapted to produce a third output signal related to the difference therebetween.

6. Apparatus for detecting the temperature of a target radiating microwave energy including an antenna upon which microwave energy from the target may be incident, a source of constant microwave frequency signals, means connected to the source to turn the source on and off at a fixed rate, frequency mixing means, a directional coupler connecting the antenna and the source to the mixing means and responsive to the presence of signals from the source to present the same in combination with the signals from the antenna to the mixing means and responsive to the absence of signals from the source to interrupt the transmission of antenna signals to the mixing means, the mixing means being responsive to the input signals to produce first and second output signals during the respective on and off times of the source, the first signal being related to the magnitude of microwave energy incident upon the antenna and the second signal being related to the temperature of the frequency mixing means, and receiving means connected to receive the first and second signals and adapted to produce a third signal related to the difference therebetween.

7. Apparatus for detecting the temperature of a target radiating microwave frequency energy, the apparatus including an antenna adapted to receive microwave energy from the target, a source of constant magnitude energy of microwave frequency, switching means connected to the source to alternately turn the source on and off at a fixed rate, frequency mixing means, a directional coupler connecting the antenna and the source to the mixing means and responsive to the presence of signals from the source to present the same in combination with the signals from the antenna to the mixing means and responsive to the absence of signals from the source to interrupt the transmission of antenna signals to the mixing means, the mixing means being responsive to the input signals to alternately produce first and second output signals during the respective on and off times of the source, the first signal being related to the temperature of the target radiating energy to the antenna and the second signal being related to the temperature of the frequency mixing means, a bias source of constant magnitude energy connected to the frequency mixing means and synchronized with the switching means to be turned on and off in a predetermined phase relation to the on and off states of the source thereby to maintain the temperature of the mixing means at a constant level irrespective of the on or off state of the source, and receiving means connected to receive the first and second signals and adapted to produce a third signal related to the difference therebetween.

References Cited in the file of this patent

UNITED STATES PATENTS

| | | |
|---|---|---|
| 2,710,559 | Heitmuller et al. | June 14, 1955 |
| 3,017,505 | Clapp | Jan. 16, 1962 |
| 3,065,347 | Bossart | Nov. 20, 1962 |
| 3,081,399 | Schwartz | Mar. 12, 1963 |

OTHER REFERENCES

Dicke: "The Measurement of Thermal Radiation at Microwave Frequencies," Review of Scientific Instruments, vol. 17, No. 7, July 1946, pp. 268–275.